US010950170B2

United States Patent

Li

(10) Patent No.: US 10,950,170 B2
(45) Date of Patent: Mar. 16, 2021

(54) DISPLAY PANEL, DRIVING METHOD THEREOF, AND DISPLAY DEVICE

(71) Applicant: BOE Technology Group Co., Ltd., Beijing (CN)

(72) Inventor: Zhenzhen Li, Beijing (CN)

(73) Assignee: BOE Technology Group Co., Ltd, Beijing (CN)

( * ) Notice: Subject to any disclaimer, the term of this patent is extended or adjusted under 35 U.S.C. 154(b) by 0 days.

(21) Appl. No.: 16/652,586

(22) PCT Filed: May 8, 2019

(86) PCT No.: PCT/CN2019/086071
§ 371 (c)(1),
(2) Date: Mar. 31, 2020

(87) PCT Pub. No.: WO2019/237855
PCT Pub. Date: Dec. 19, 2019

(65) Prior Publication Data

US 2020/0234634 A1 Jul. 23, 2020

(30) Foreign Application Priority Data

Jun. 13, 2018 (CN) ......................... 201810608433.3

(51) Int. Cl.
*G06F 3/038* (2013.01)
*G09G 5/00* (2006.01)
*G09G 3/3208* (2016.01)

(52) U.S. Cl.
CPC ... *G09G 3/3208* (2013.01); *G09G 2300/0465* (2013.01); *G09G 2320/0626* (2013.01); *G09G 2320/0673* (2013.01)

(58) Field of Classification Search
CPC ....... G09G 2300/04; G09G 2300/0439; G09G 2300/0465; G09G 2320/0233;
(Continued)

(56) References Cited

U.S. PATENT DOCUMENTS

2003/0128324 A1* 7/2003 Woods ................ G11C 13/042
349/143
2011/0019036 A1* 1/2011 Okado .................. H04N 5/361
348/243
(Continued)

FOREIGN PATENT DOCUMENTS

CN 1920934 A 2/2007
CN 104469344 A 3/2015
(Continued)

OTHER PUBLICATIONS

Office Action for corresponding Chinese Application 201810608433.3 dated Aug. 26, 2019.
(Continued)

*Primary Examiner* — Insa Sadio
(74) *Attorney, Agent, or Firm* — Arent Fox LLP; Michael Fainberg

(57) ABSTRACT

A display panel, a driving method thereof, and a display device. The display method includes: upon displaying each frame, determining an initial gray scale value corresponding to each sub-pixel according to image data corresponding to the frame; controlling display brightness of the sub-pixels in the second display region and the third display region according to the initial gray scale values corresponding to the sub-pixels, and reducing a display brightness difference between the sub-pixels in the second display region and the sub-pixels in the third display region so as to enhance the brightness uniformity of the regions of a display panel.

14 Claims, 5 Drawing Sheets

(58) Field of Classification Search
CPC ... G09G 2320/0626; G09G 2320/0673; G09G 2360/16; G09G 3/3208; G09G 3/3233
See application file for complete search history.

(56) References Cited

U.S. PATENT DOCUMENTS

| | | | |
|---|---|---|---|
| 2014/0111405 | A1 | 4/2014 | Jeong et al. |
| 2017/0345402 | A1 | 11/2017 | Zhou et al. |
| 2018/0374426 | A1 | 12/2018 | Chen et al. |
| 2020/0234634 | A1 | 7/2020 | Li |

FOREIGN PATENT DOCUMENTS

| | | | |
|---|---|---|---|
| CN | 105096875 | A | 11/2015 |
| CN | 105374340 | A | 3/2016 |
| CN | 106328094 | A | 1/2017 |
| CN | 107146573 | A | 9/2017 |
| CN | 108682374 | A | 10/2018 |
| CN | 108766347 | A | 11/2018 |
| EP | 2444962 | A1 | 4/2012 |
| KR | 20140051006 | A | 4/2014 |
| WO | 2017127190 | A1 | 7/2017 |

OTHER PUBLICATIONS

Office Action for corresponding Chinese Application 201810608433.3 dated Mar. 27, 2020.

* cited by examiner

DISPLAY PANEL, DRIVING METHOD THEREOF, AND DISPLAY DEVICE

The present disclosure is a US National Stage of International Application No. PCT/CN2019/086071, filed on May 8, 2019, which claims the priority of a Chinese patent application filed in the China National Intellectual Property Administration on Jun. 13, 2018 with application number 201810608433.3 and application name "Display Panel, Driving Method thereof, and Display Device", the entire contents of which are hereby incorporated by reference.

FIELD

The present disclosure relates to the technical field of display, in particular to a display panel, a display method thereof and a display device.

BACKGROUND

With the development of display electronic products such as mobile phones, the increase in screen-to-body ratio of a display screen has become a trend. However, some necessary functional components of mobile phones, such as front cameras, are undoubtedly a major factor restricting the increase in screen-to-body ratio. In view of the factor, some people propose an under-screen camera solution. A camera is moved to be under a screen by reducing local pixel density and increasing light transmittance of the screen, and due to the decrease in pixel density, the brightness of a local transparent region is bound to be lower than that of a surrounding region, thus causing the local transparent region to be a dark region with obvious boundaries.

SUMMARY

In a first aspect, embodiments of the present disclosure provide a display method of a display panel, where a display region of the display panel includes a first display region, a second display region and a third display region, and the third display region is arranged between the first display region and the second display region, and surrounds the second display region; and a distribution density of sub-pixels in the third display region is greater than a distribution density of sub-pixels in the second display region, and the distribution density of the sub-pixels in the third display region is not greater than a distribution density of sub-pixels in the first display region. The display method includes:

when displaying a frame, determining initial gray scale values corresponding to respective sub-pixels according to image data corresponding to the frame; and controlling display brightness of sub-pixels in the second display region and the third display region according to the initial gray scale values corresponding to the respective sub-pixels, to reduce a display brightness difference between the sub-pixels in the second display region and the sub-pixels in the third display region.

Optionally, in the display method of the display panel provided by an embodiment of the present disclosure, the controlling the display brightness of sub-pixels in the second display region and the third display region to reduce the display brightness difference between the sub-pixels in the second display region and the sub-pixels in the third display region includes:

controlling the sub-pixels in the second display region to display according to brightness higher than brightness corresponding to corresponding initial gray scale values.

Optionally, in the display method of the display panel provided by the embodiment of the present disclosure, the controlling the sub-pixels in the second display region to display according to brightness higher than brightness corresponding to the corresponding initial gray scale values includes:

when the display panel is an organic light emitting diode (OLED) display panel, performing display by increasing luminous current corresponding to the sub-pixels in the second display region.

Optionally, in the display method of the display panel provided by the embodiments of the present disclosure, the performing display by increasing luminous current corresponding to the sub-pixels in the second display region includes:

for any sub-pixel whose initial gray scale value is less than a preset gray scale value, adjusting the initial gray scale value x according to a formula $$b\left(\frac{x}{255}\right)^{Gamma} = \left(\frac{y}{255}\right)^{Gamma}$$

to obtain a target gray scale value y, and performing display according to the target gray scale value y; where b is determined according to the distribution density of the sub-pixels in the third display region and the distribution density of the sub-pixels in the second display region, and Gamma is a gamma value of the display panel.

Optionally, in the display method of the display panel provided by the embodiments of the present disclosure, the performing display by increasing luminous current corresponding to the sub-pixels in the second display region includes:

for any sub-pixel whose initial gray scale value is greater than or equal to a preset gray scale value, increasing the luminous current by increasing a supply voltage corresponding to the sub-pixel.

Optionally, in the display method of the display panel provided by the embodiments of the present disclosure, the controlling the display brightness of sub-pixels in the second display region and the third display region to reduce the display brightness difference between the sub-pixels in the second display region and the sub-pixels in the third display region includes:

controlling the sub-pixels in the third display region to display according to brightness lower than brightness corresponding to corresponding initial gray scale values, and controlling the sub-pixels in the first display region to display according to brightness corresponding to corresponding initial gray scale values.

Optionally, in the display method of the display panel provided by the embodiment of the present disclosure, the controlling the sub-pixels in the third display region to display according to the brightness lower than the brightness corresponding to the corresponding initial gray scale value includes:

dividing the third display region into n sub-regions in a direction from the second display region to the first display region in sequence, and for sub-pixels of each of the sub-regions:

adjusting initial gray scale values corresponding to the respective sub-pixels to obtain target gray scale values so as to reduce brightness, and performing display according to the target gray scale values; where for any of sub-pixels with same corresponding initial gray scale values, the closer a distance from the sub-regions where the any sub-pixel is arranged to the second display region, the smaller the target gray scale value corresponding to the any sub-pixel.

Optionally, in the display method of the display panel provided by the embodiments of the present disclosure, for any of the sub-pixels in the third display region, the initial gray scale value x is adjusted according to a formula $$\frac{1}{b}\left(\frac{x}{255}\right)^{Gamma}=\left(\frac{y}{255}\right)^{Gamma}$$

to obtain a target gray scale value y; where b is determined according to a ratio of the distribution density of the sub-pixels in the third display region to the distribution density of the sub-pixels in the second display region, and Gamma is a gamma value of the display panel.

Optionally, in the display method of the display panel provided by the embodiments of the present disclosure, for the sub-pixels with the same corresponding initial gray scale values, in the third display region, brightness corresponding to the respective sub-regions sequentially increases in equal proportion in a direction from the second display region to the first display region.

Optionally, in the display method of the display panel provided by the embodiment of the present disclosure, the initial gray scale value x is adjusted to obtain a target gray scale value y according to a formula $$\left[\frac{1}{b}+\frac{(b-1)(i-1)}{bn}\right]\left(\frac{x}{255}\right)^{Gamma}=\left(\frac{y}{255}\right)^{Gamma},$$

for any sub-pixel in an $i^{th}$ sub-region in the direction from the second display region to the first display region, in the third display region; where b is determined according to the ratio of the distribution density of the sub-pixels in the second display region to the distribution density of the sub-pixels in the third display region, Gamma is the gamma value of the display panel, and i is an integer greater than 0 and less than or equal to n.

Optionally, in the display method of the display panel provided by the embodiments of the present disclosure, the controlling the display brightness of the sub-pixels in the second display region and the third display region to reduce the display brightness difference between the sub-pixels in the second display region and the sub-pixels in the third display region includes:

controlling the sub-pixels in the second display region to display according to brightness higher than brightness corresponding to corresponding initial gray scale values;

controlling the sub-pixels in the third display region to display according to brightness lower than brightness corresponding to corresponding initial gray scale values; and controlling the sub-pixels in the first display region to display according to the brightness corresponding to corresponding initial gray scale values.

Optionally, in the display method of the display panel provided by the embodiment of the present disclosure, b is obtained by dividing the distribution density of the sub-pixels in the first display region by the distribution density of the sub-pixels in the second display region.

In a second aspect, an embodiment of the present disclosure further provides a display panel, which performs display according to the display method of any one of embodiments in the first aspect for display.

In a third aspect, an embodiment of the present disclosure further provides a display device including the display panel according to the embodiments in the second aspect.

DETAILED DESCRIPTION OF THE EMBODIMENTS

Embodiments of the present disclosure provide a display panel, a display method thereof and a display device. In order to make objectives, technical solutions, and advantages of the present disclosure clearer, the present disclosure will be described in further detail below with reference to accompanying drawings. Obviously, the described embodiments are only a part of embodiments of the present disclosure, not all embodiments. Based on the embodiments in the present disclosure, all other embodiments obtained by ordinary those skilled in the art without creative labor are within the scope of protection of the present disclosure.

The shapes and sizes of components in the accompanying drawings do not reflect true proportions, and are only for a purpose of schematically illustrating the present disclosure.

Figure 1:
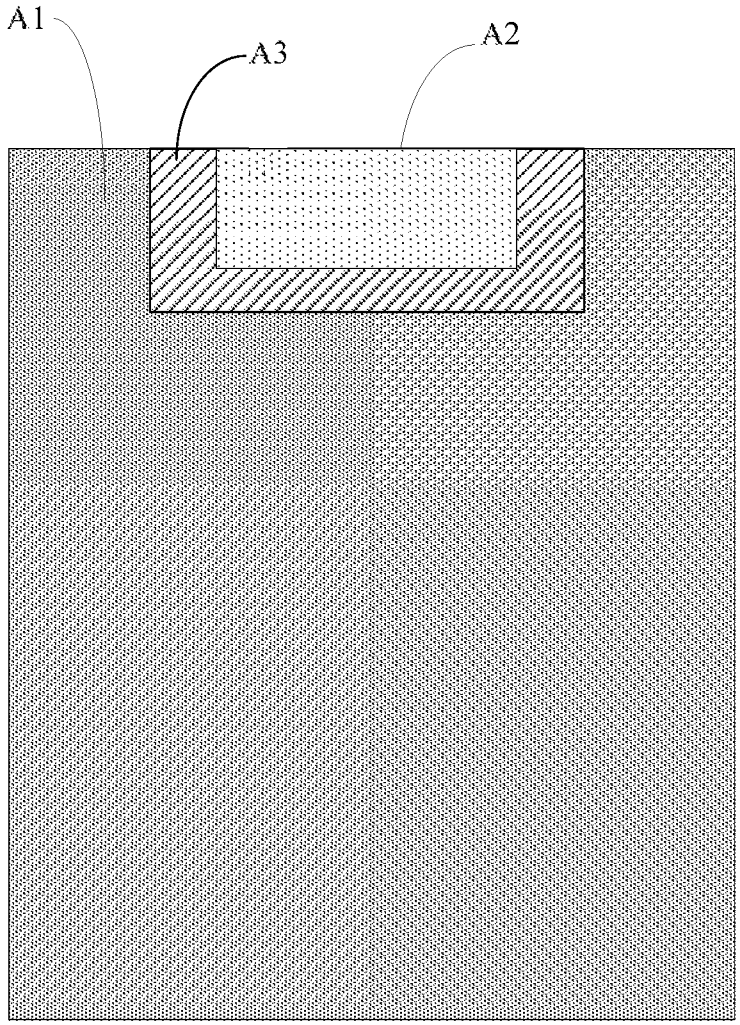
FIG. 1 is a structural schematic diagram of a display panel provided by an embodiment of the present disclosure.

The embodiments of the present disclosure provide a display method of a display panel, as shown in FIG. 1, a display region of the display panel includes a first display region A1, a second display region A2 and a third display region A3; the third display region A3 is located between the first display region A1 and the second display region A2, and surrounds the second display region A2; and a distribution density of sub-pixels in the third display region A3 is greater than a distribution density of sub-pixels in the second display region A2, and the distribution density of the sub-pixels in the third display region A3 is not greater than a distribution density of sub-pixels in the first display region A1. That is, the first display region A1 is a high-resolution display region, the second display region A2 is a low-resolution display region, and the third display region A3 may be a region with the same resolution as the first display region A1 or a region with a resolution between the first display region A1 and the second display region A2. In specific implementation, the second display region may be located at any position on a screen of the display panel and may be designed to be in any shape as needed, which is not limited herein.

Figure 2:
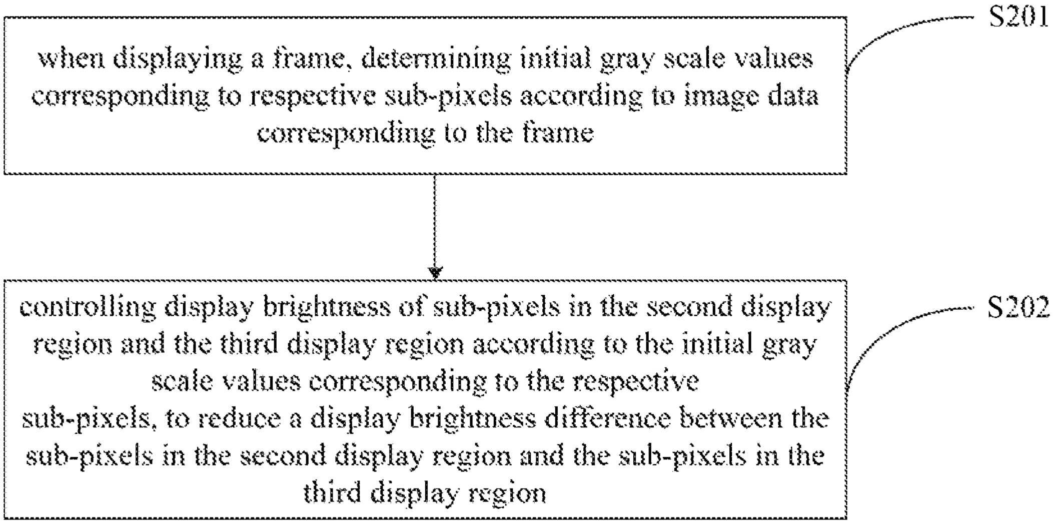
FIG. 2 is a flow chart of a display method provided by an embodiment of the present disclosure.

As shown in FIG. 2, the display method includes:

S201, when displaying a frame, determining initial gray scale values corresponding to respective sub-pixels according to image data corresponding to the frame; and

S202, controlling display brightness of sub-pixels in the second display region and the third display region according to the initial gray scale values corresponding to the respective sub-pixels, to reduce a display brightness difference between the sub-pixels in the second display region and the sub-pixels in the third display region.

Since the distribution density of the pixels in the second display region is low, if display is performed according to the initial gray scale values, the brightness of the second display region is bound to be lower than that of a surrounding region, thus causing the second display region to be a dark region with obvious boundaries. In order to reduce the display brightness difference between the second display region and the first display region, and the display brightness difference between the second display region and the third display region, the display brightness of the sub-pixels in the second display region and the display brightness of the sub-pixels in the third display region can be adjusted to reduce the brightness difference between the display regions. Since the distribution density of the sub-pixels in the third display region is greater than the distribution density of the sub-pixels in the second display region and less than or equal to the distribution density of the sub-pixels in the first display region, the brightness in the third display region is between the brightness in the first display region and the brightness in the second display region, thus when the brightness difference between the third display region and the second display region is reduced, the brightness difference between the second display region and the first display region is also reduced. For example, the display brightness of the sub-pixels in the second display region can be increased so as to reduce the display brightness difference between the second display region and the third display region; or the display brightness of the sub-pixels in the third display region can be reduced so as to reduce the display brightness difference between the second display region and the third display region; of course, the display brightness of the sub-pixels in the second display region and the display brightness of the sub-pixels in the third display region can also be adjusted simultaneously; and a specific method is to be adopted according to actual situations, which will not be limited herein.

Figure 3:
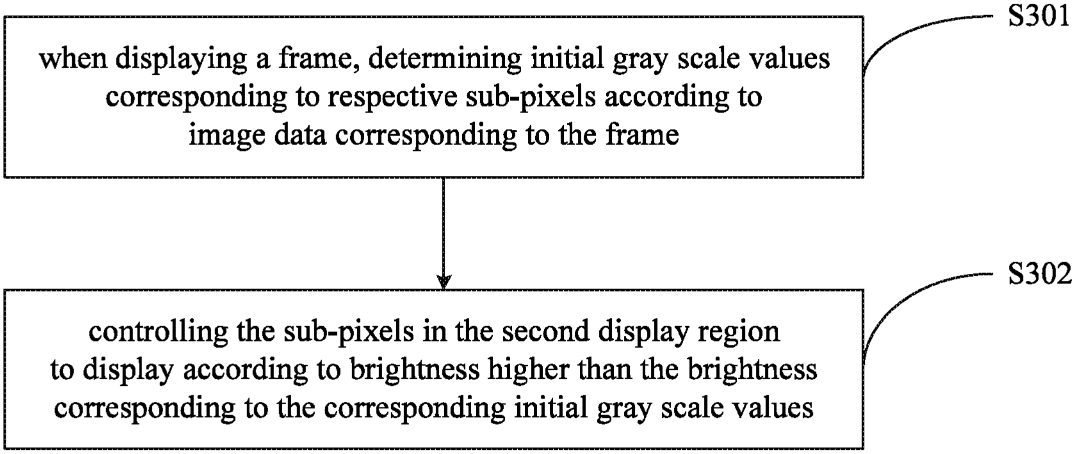
FIG. 3 is a flow chart of another display method provided by an embodiment of the present disclosure.

Optionally, in a display method of the display panel provided by an embodiment of the present disclosure, when the display brightness of the sub-pixels in the third display region is brightness corresponding to the initial gray scale values, the display brightness of the sub-pixels in the second display region and the third display region is controlled to reduce the display brightness difference between the sub-pixels in the second display region and the sub-pixels in the third display region, as shown in FIG. 3, and the display method specifically includes following steps:

S301, when displaying a frame, determining initial gray scale values corresponding to respective sub-pixels according to image data corresponding to the frame; and

S302, controlling the sub-pixels in the second display region to display according to brightness higher than the brightness corresponding to the corresponding initial gray scale values.

When the display panel is an OLED display panel, display can be performed by increasing luminous current corresponding to the sub-pixels in the second display region, that is, the brightness corresponding to the pixels in the second display region is increased by increasing the luminous current corresponding to the sub-pixels in the second display region.

Figure 4:
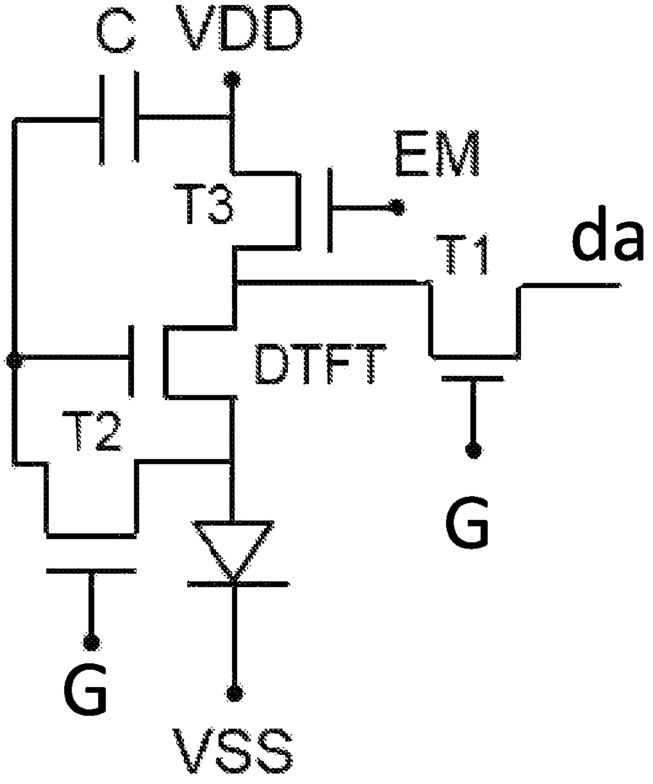
FIG. 4 is a structural schematic diagram of a pixel circuit provided by an embodiment of the present disclosure.

In specific implementation, the luminous current of each sub-pixel is generally determined by a data signal (i.e., a gray scale voltage) and a supply voltage. Taking a (4T1C) pixel circuit shown in FIG. 4 as an example, the luminous current flowing through each sub-pixel is obtained by a formula: $I=\frac{1}{2}*k*(Vda-VDD)^2$, where k is a constant, Vda is the data signal, and VDD is the supply voltage. According to the formula, the luminous current I can be increased by adjusting VDD and/or Vda, thereby increasing the brightness of the second display region.

Specifically, in the display method of the display panel provided by the embodiment of the present disclosure, the brightness corresponding to the pixels in the second display region is increased by increasing the luminous current corresponding to the sub-pixels in the second display region, which can be realized through following two ways.

One way is as follows: for any sub-pixel whose initial gray scale value is less than a preset gray scale value, the initial gray scale value x is adjusted according to a formula $$b\left(\frac{x}{255}\right)^{Gamma}=\left(\frac{y}{255}\right)^{Gamma}$$

to obtain a target gray scale value y, and display is performed according to the target gray scale value y, where b is determined according to the distribution density of the sub-pixels in the first display region and the distribution density of the sub-pixels in the second display region, and Gamma is a gamma value of the display panel.

Assuming that a ratio of the distribution density of the sub-pixels in the first display region to the distribution density of the sub-pixels in the second display region is 4:1, and the distribution density of the sub-pixels in the third display region is the same as the distribution density of the sub-pixels in the first display region, four pixels are displayed per unit area in the third display region, and one pixel is displayed per unit area in the second display region. When an image is displayed, the brightness of the second display region is theoretically ¼ of the brightness of the third display region. According to a brightness formula $L=k*(X/255)^{Gamma}$, when the brightness of the second display region is adjusted to be b times the original brightness, the corresponding target gray scale value, i.e., Y in $b*L=k*(Y/255)^{Gamma}$, can be deduced; where L represents brightness, X represents an initial gray scale value, Y represents a target gray scale value, a theoretical value of b is 4, a specific adjustment coefficient can be adjusted according to an actual display effect, k is generally equal to 350, k can also be adjusted according to actual standard brightness, and Gamma is a gamma value of the display panel, and is generally 2.2. Therefore, according to a formula: $b*(x/255)^{Gamma}=(y/255)^{Gamma}$, the target gray scale value corresponding to each sub-pixel in the second display region can be obtained.

The other way is as follows: for any sub-pixel whose initial gray scale value is greater than or equal to a preset gray scale value, the luminous current is increased by increasing a supply voltage corresponding to each of the sub-pixels.

As a highest gray scale value of the display panel can only be adjusted to be 255, the ability to adjust the brightness by adjusting the gray scale value is limited for high gray scale images displayed in the second display region, i.e., sub-pixels whose initial gray scale values are greater than the preset gray scale value. Therefore, for any sub-pixel whose initial gray scale value is greater than the preset gray scale value, the luminous current can be increased by increasing the supply voltage corresponding to the sub-pixel in the second display region, thereby improving the brightness of the second display region.

It should be noted that the distribution density of the sub-pixels refers to the number of the sub-pixels per unit area. The higher the distribution density of the sub-pixels, the higher the resolution of the display panel. The preset gray scale value is set according to the actual display effect of the display panel, which is not limited herein.

Optionally, in the display method provided by the embodiment of the present disclosure, b is theoretically obtained by dividing the distribution density of the sub-pixels in the third display region by the distribution density of the sub-pixels in the second display region, and of course b can be adjusted according to the actual display effect, which is not limited herein.

In addition to the above method in which the display brightness difference between the third display region and the second display region is reduced by increasing the brightness corresponding to the sub-pixels in the second display region, the display brightness difference between the third display region and the second display region can also be reduced by reducing the brightness corresponding to the sub-pixels in the third display region.

Figure 5:
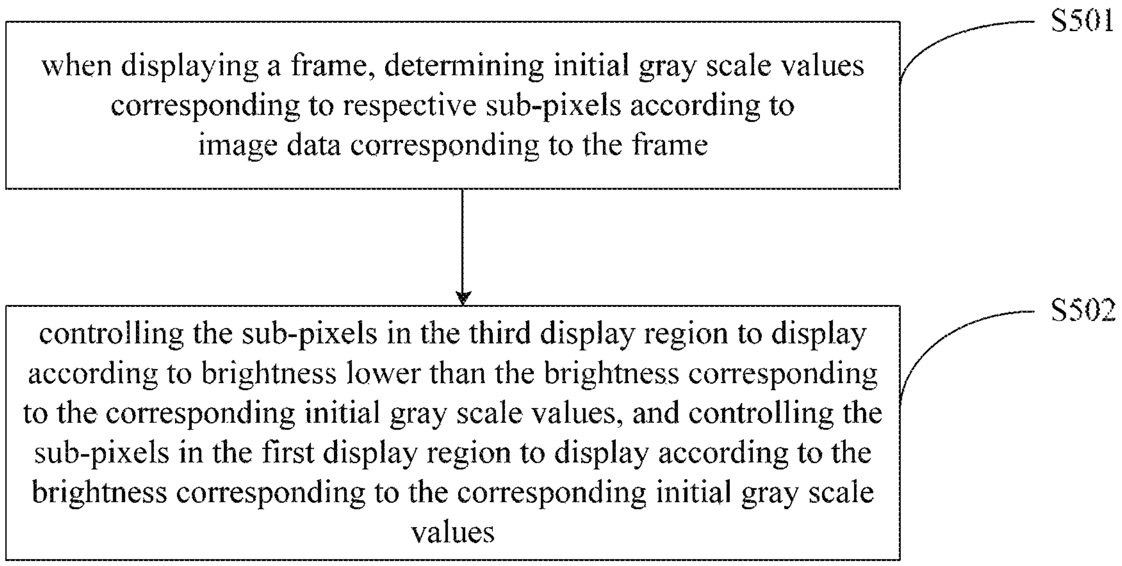
FIG. 5 is a flow chart of another display method provided by an embodiment of the present disclosure.

Specifically, in a display method of a display panel provided by an embodiment of the present disclosure, when the display brightness of the sub-pixels in the second display region is brightness corresponding to the initial gray scale values, the display brightness of the sub-pixels in the second display region and the third display region is controlled to reduce the display brightness difference between the sub-pixels in the second display region and the sub-pixels in the third display region, as shown in FIG. 5, and the display method specifically includes following steps:

S501, when displaying a frame, determining initial gray scale values corresponding to respective sub-pixels according to image data corresponding to the frame; and S502, controlling the sub-pixels in the third display region to display according to brightness lower than the brightness corresponding to the corresponding initial gray scale values, and controlling the sub-pixels in the first display region to display according to the brightness corresponding to the corresponding initial gray scale values.

How to reduce the brightness in the third display region will be described in detail below through embodiments.

Figure 6:
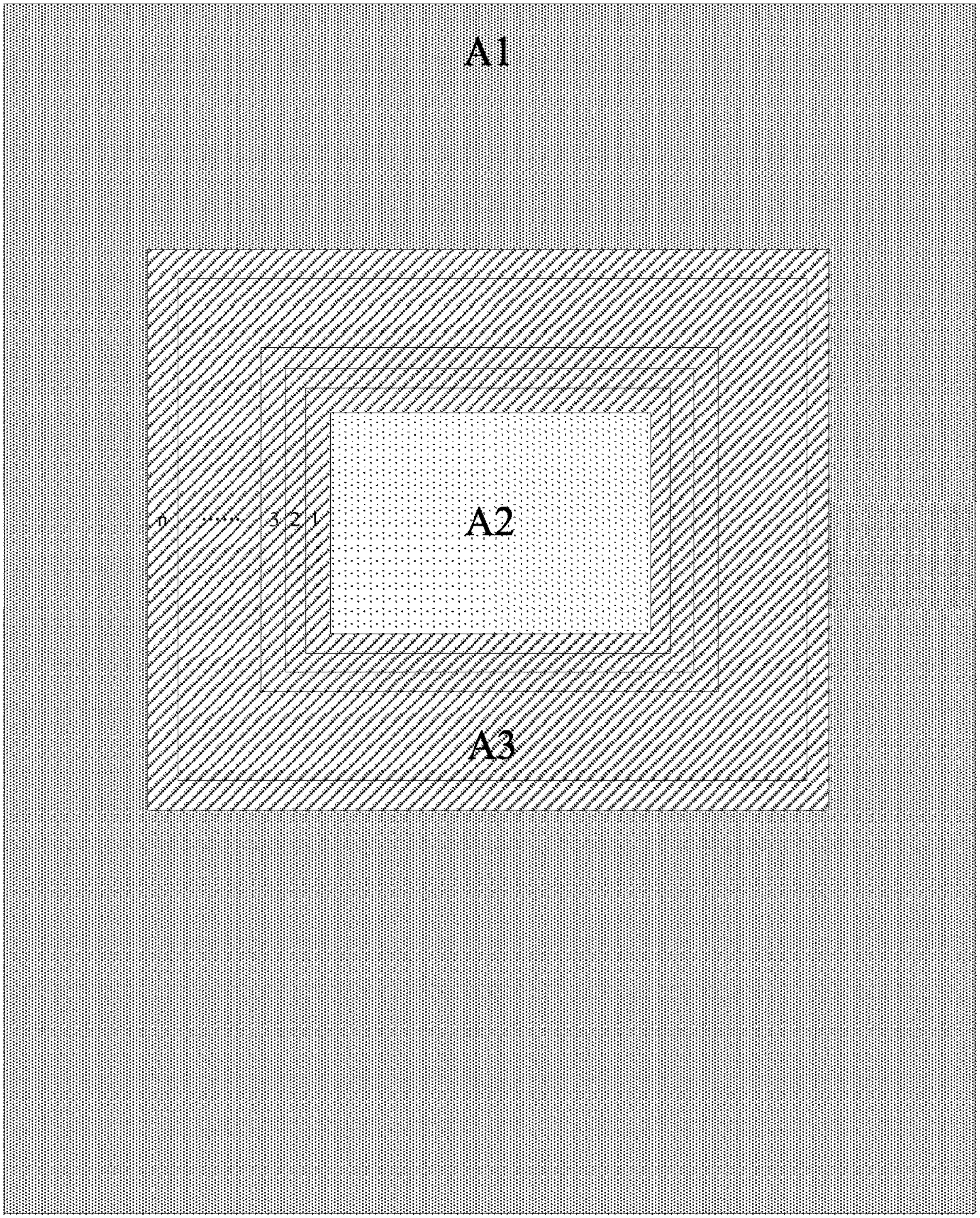
FIG. 6 is a schematic diagram of dividing a third display region into sub-regions.

Optionally, in the display method provided by the embodiment of the present disclosure, the controlling the sub-pixels in the third display region to display according to brightness lower than the brightness corresponding to the corresponding initial gray scale values specifically includes following steps:

as shown in FIG. 6, dividing the third display region into n sub-regions in a direction from the second display region to the first display region in sequence, and for sub-pixels of each of the sub-region:

adjusting the corresponding initial gray scale values to obtain target gray scale values so as to reduce brightness, and performing display according to the target gray scale values, where for any of sub-pixels with same corresponding initial gray scale values, the closer a distance from the sub-region where the any sub-pixel is located to the second display region, the smaller the target gray scale value corresponding to the any sub-pixel.

That is, the closer a sub-region to the second display region is, the lower brightness of the sub-region is, and the further a sub-region to the second display region is, the higher brightness of the sub-region is, thereby eliminating the dark region and boundary dividing lines by allowing a smooth brightness transition from the third display region to the second display region.

In specific implementation, a preset range is set according to the size of a screen of the display panel and the actual display effect, which is not limited herein.

Specifically, in the display method provided by the embodiment of the present disclosure, for any sub-pixel in a sub-region adjacent to the second display region, the initial gray scale value x is adjusted according to the formula $$\frac{1}{b}\left(\frac{x}{255}\right)^{Gamma}=\left(\frac{y}{255}\right)^{Gamma}$$

to obtain a target gray scale value y; where b is determined according to a ratio of the distribution density of the sub-pixels in the third display region to the distribution density of the sub-pixels in the second display region, and Gamma is a gamma value of the display panel. That is, the brightness of sub-pixels closest to the second display region is reduced to theoretically coincide with the brightness of the second display region.

As shown in FIG. 6, it is assumed that the third display region A3 is sequentially divided into 16 sub-regions in the direction from the second display region to the first display region, 1-n as shown in the figure. Assuming that the normal brightness of the third display region A3 is L, the brightness in a sub-region 1 of the third display region A3 closest to the second display region A2 is adjusted to be 1/b of L, that is, the brightness of the first sub-region in the direction from the second display region A2 to the first display region A1 is L*1/b. Therefore, according to the above brightness formula, a relationship between the target gray scale value y and the initial gray scale value x of each sub-pixel in the first sub-region 1 is:

$$\frac{1}{b}\left(\frac{x}{255}\right)^{Gamma}=\left(\frac{y}{255}\right)^{Gamma};$$

where b is a brightness adjustment coefficient of the first sub-region, and a specific value can also be set according to the actual display effect. For example, the brightness of the first sub-region is the same as the brightness of the second display region A2, and assuming that a ratio of the distribution density of the sub-pixels in the first display region A1 to the distribution density of the sub-pixels in the second display region A2 is 4:1, and the distribution density of the sub-pixels in the third display region A3 is the same as the distribution density of the first display region A1, then the brightness of the second display region A2 is theoretically ¼ of the brightness of the third display region A3. Therefore, b can be determined according to a ratio of the distribution density of the sub-pixels in the third display region A3 to the distribution density of the sub-pixels in the second display region A2.

In specific implementation, in the display method provided by the embodiment of the present disclosure, the value of n is determined according to actual situations, and the larger the value of n, the smaller a transition gradient and the smaller a brightness difference.

Further, in the display method provided by the embodiment of the present disclosure, there is a transition from the brightness of the second display region to the normal brightness of the first display region in a preset range, and sizes of sub-regions (transition sections) n in the third display region and the magnitude of change of the brightness transition gradients can be adjusted according to the actual display effect.

Optionally, in the display method provided by the embodiment of the present disclosure, for sub-pixels with same corresponding initial gray scale values, in the third display region, the brightness corresponding to the respective sub-regions sequentially increases in equal proportion in the direction from the second display region to the first display region. That is, the brightness transition gradients of the sub-regions are equal.

Optionally, in the display method provided by the embodiment of the present disclosure, when the brightness transition gradients remain unchanged, for any sub-pixel in an $i^{th}$ sub-region in a direction from a boundary line between the first display region and the second display region to the first display region, the initial gray scale value x is adjusted to obtain a target gray scale value y according to a formula $$\left[\frac{1}{b}+\frac{(b-1)(i-1)}{bn}\right]\left(\frac{x}{255}\right)^{Gamma}=\left(\frac{y}{255}\right)^{Gamma};$$

where b is determined according to a ratio of the distribution density of the sub-pixels in the second display region to the distribution density of the sub-pixels in the third display region, Gamma is a gamma value of the display panel, and i is an integer greater than 0 and less than or equal to n.

Taking n=12 and b=4 as an example, a relationship between a target gray scale value y and an initial gray scale value x of each sub-pixel in the first sub-region is:

$$\frac{1}{4}\left(\frac{x}{255}\right)^{Gamma}=\left(\frac{y}{255}\right)^{Gamma};$$

a relationship between a target gray scale value v and an initial gray scale value x of each sub-pixel in a second sub-region is:

$$\frac{5}{16}\left(\frac{x}{255}\right)^{Gamma}=\left(\frac{y}{255}\right)^{Gamma},$$

and by analogy, a relationship between a target gray scale value y and an initial gray scale value x of each sub-pixel in a $12^{th}$ sub-region is:

$$\frac{15}{16}\left(\frac{x}{255}\right)^{Gamma}=\left(\frac{y}{255}\right)^{Gamma}.$$

The brightness of the third display region is adjusted while the brightness of the second display region is adjusted, so as to reduce the brightness difference between the second and third display regions and the step of controlling the display brightness of the sub-pixels in the second display region and the third display region to reduce the display brightness difference between the sub-pixels in the second display region and the sub-pixels in the third display region specifically includes following steps:

controlling the sub-pixels in the second display region to display according to brightness higher than the brightness corresponding to the corresponding initial gray scale values; and controlling the sub-pixels in the third display region to display according to brightness lower than the brightness corresponding to the corresponding initial gray scale values, and controlling the sub-pixels in the first display region to display according to the brightness corresponding to the corresponding initial gray scale values.

It should be noted that the brightness corresponding to the sub-pixels in the second display region and the brightness corresponding to the sub-pixels in the third display region can be adjusted simultaneously or separately, not limited to any order of priority.

The way to adjust the brightness corresponding to the sub-pixels in the second display region and the third display region is the same as the way in the above-mentioned embodiments for adjusting the brightness of the sub-pixels in the two display regions respectively, which is not repeatedly described herein.

In summary, the display methods provided by the embodiments of the present disclosure can realize the transition from the brightness of the second display region to the brightness of the third display region and the brightness of the first display region by adjusting the brightness of the second display region and the brightness of the third display region, and can effectively improve the uniformity of a visual effect of a display screen.

In specific implementation, gray scale value conversion algorithms corresponding to the sub-pixels in the regions are packaged into IP to be integrated into IC; and for screens in the same batch, compensation pictures can be directly generated by the above IC for display, thus improving the display uniformity of the display screen.

Based on the same inventive concept, an embodiment of the present disclosure further provides a display panel, which adopts any one of the above display methods provided by the embodiments of the present disclosure for display. Since a principle of the display panel to solve problems is similar to principles of the above display methods, the implementation of the display panel can refer to the implementation of the above display methods, and will not be repeatedly described herein.

Based on the same inventive concept, an embodiment of the present disclosure further provides a display device, including the above display panel provided by the embodiment of the present disclosure. The display device may be any product or component with a display function, such as a mobile phone, a tablet computer, a television, a display, a notebook computer, a digital photo frame, and a navigator. The implementation of the display device can refer to embodiments of the above display panel, and will not be repeatedly described herein.

According to the display panel, the display method thereof and the display device provided by the embodiments of the present disclosure, when displaying a frame, the initial gray scale values corresponding to respective sub-pixels are determined according to the image data corresponding to the frame; and according to the initial gray scale values corresponding to the respective sub-pixels, the display brightness of the sub-pixels in the second display region and the third display region is controlled, so as to reduce the display brightness difference between the sub-pixels in the second display region and the sub-pixels in the third display region. By controlling the display brightness of the sub-pixels in the second display region and the third display region, the brightness difference between the display regions can be effectively reduced, thereby improving the brightness uniformity of the display regions of the display panel.

Obviously, those skilled in the art can make various changes and modifications to the present disclosure without departing from the spirit and scope of the present disclosure. Thus, the present disclosure is also intended to include the changes and the modifications if the changes and the modifications fall within the scope of the claims of the present disclosure and equivalent technologies thereof.

What is claimed is:

1. A display method of a display panel, wherein a display region of the display panel comprises a first display region, a second display region and a third display region, and the third display region is arranged between the first display region and the second display region, and surrounds the second display region; and a distribution density of sub-pixels in the third display region is greater than a distribution density of sub-pixels in the second display region, and the distribution density of the sub-pixels in the third display region is not greater than a distribution density of sub-pixels in the first display region;

wherein the display method comprises:

when displaying a frame, determining initial gray scale values corresponding to respective sub-pixels according to image data corresponding to the frame; and controlling display brightness of sub-pixels in the second display region and the third display region according to the initial gray scale values corresponding to the respective sub-pixels, to reduce a display brightness difference between the sub-pixels in the second display region and the sub-pixels in the third display region.

2. The display method according to claim 1, wherein the controlling the display brightness of sub-pixels in the second display region and the third display region to reduce the display brightness difference between the sub-pixels in the second display region and the sub-pixels in the third display region comprises:

controlling the sub-pixels in the second display region to display according to brightness higher than brightness corresponding to corresponding initial gray scale values.

3. The display method according to claim 2, wherein the controlling the sub-pixels in the second display region to display according to brightness higher than brightness corresponding to the corresponding initial gray scale values comprises:

when the display panel is an organic light emitting diode (OLED) display panel, performing display by increasing luminous current corresponding to the sub-pixels in the second display region.

4. The display method according to claim 3, wherein the performing display by increasing luminous current corresponding to the sub-pixels in the second display region comprises:

for any sub-pixel whose initial gray scale value is less than a preset gray scale value, adjusting the initial gray scale value x according to a formula $$b\left(\frac{x}{255}\right)^{Gamma}=\left(\frac{y}{255}\right)^{Gamma}$$

to obtain a target gray scale value y, and performing display according to the target gray scale value y;

wherein b is determined according to the distribution density of the sub-pixels in the third display region and the distribution density of the sub-pixels in the second display region, and Gamma is a gamma value of the display panel.

5. The display method according to claim 3, wherein the performing display by increasing luminous current corresponding to the sub-pixels in the second display region comprises:

for any sub-pixel whose initial gray scale value is greater than or equal to a preset gray scale value, increasing the luminous current by increasing a supply voltage corresponding to the sub-pixel.

6. The display method according to claim 1, wherein the controlling the display brightness of sub-pixels in the second display region and the third display region to reduce the display brightness difference between the sub-pixels in the second display region and the sub-pixels in the third display region comprises:

controlling the sub-pixels in the third display region to display according to brightness lower than brightness corresponding to corresponding initial gray scale values, and controlling the sub-pixels in the first display region to display according to brightness corresponding to corresponding initial gray scale values.

7. The display method according to claim 6, wherein the controlling the sub-pixels in the third display region to display according to the brightness lower than the brightness corresponding to the corresponding initial gray scale values comprises:

dividing the third display region into n sub-regions in a direction from the second display region to the first display region in sequence, and for sub-pixels of each of the sub-regions:

adjusting initial gray scale values corresponding to the respective sub-pixels to obtain target gray scale values so as to reduce brightness, and performing display according to the target gray scale values; wherein for any of sub-pixels with same corresponding initial gray scale values, the closer a distance from the sub-region where the any sub-pixel is arranged to the second display region, the smaller the target gray scale value corresponding to the any sub-pixel.

8. The display method according to claim 7, wherein for any of the sub-pixels in the third display region, the initial gray scale value x is adjusted according to a formula $$\frac{1}{b}\left(\frac{x}{255}\right)^{Gamma}=\left(\frac{y}{255}\right)^{Gamma}$$

to obtain a target gray scale value y;

wherein b is determined according to a ratio of the distribution density of the sub-pixels in the third display region to the distribution density of the sub-pixels in the second display region, and Gamma is a gamma value of the display panel.

9. The display method according to claim 7, wherein for the sub-pixels with the same corresponding initial gray scale values, in the third display region, brightness corresponding to the respective sub-regions sequentially increases in equal proportion in the direction from the second display region to the first display region.

10. The display method according to claim 9, wherein, the initial gray scale value x is adjusted to obtain a target gray scale value y according to a formula $$\left[\frac{1}{b}+\frac{(b-1)(i-1)}{bn}\right]\left(\frac{x}{255}\right)^{Gamma}=\left(\frac{y}{255}\right)^{Gamma},$$

for any sub-pixel in an $i^{th}$ sub-region in the direction from the second display region to the first display region, in the third display region;

wherein b is determined according to the ratio of the distribution density of the sub-pixels in the second display region to the distribution density of the sub-pixels in the third display region, Gamma is the gamma value of the display panel, and i is an integer greater than 0 and less than or equal to n.

11. The display method according to claim 1, wherein the controlling the display brightness of the sub-pixels in the second display region and the third display region to reduce the display brightness difference between the sub-pixels in the second display region and the sub-pixels in the third display region comprises:

controlling the sub-pixels in the second display region to display according to brightness higher than brightness corresponding to corresponding initial gray scale values;

controlling the sub-pixels in the third display region to display according to brightness lower than brightness corresponding to corresponding initial gray scale values; and controlling the sub-pixels in the first display region to display according to the brightness corresponding to corresponding initial gray scale values.

12. The display method according to claim 4, wherein b is obtained by dividing the distribution density of sub-pixels in the first display region by the distribution density of sub-pixels in the second display region.

13. A display panel, wherein the display panel performs display according to the display method of claim 1.

14. A display device, comprising the display panel according to claim 13.

* * * * *